April 1, 1952 D. BARTH 2,591,394

TRIMMING AND SLITTING MACHINE FOR QUILTS AND THE LIKE

Filed Oct. 23, 1948 4 Sheets-Sheet 1

INVENTOR.
DAVID BARTH
BY
ATTORNEY

April 1, 1952            D. BARTH            2,591,394

TRIMMING AND SLITTING MACHINE FOR QUILTS AND THE LIKE

Filed Oct. 23, 1948            4 Sheets-Sheet 2

INVENTOR.
DAVID BARTH
BY
ATTORNEY

April 1, 1952 D. BARTH 2,591,394
TRIMMING AND SLITTING MACHINE FOR QUILTS AND THE LIKE
Filed Oct. 23, 1948 4 Sheets-Sheet 4

INVENTOR.
DAVID BARTH
BY
ATTORNEY

Patented Apr. 1, 1952

2,591,394

UNITED STATES PATENT OFFICE 2,591,394

TRIMMING AND SLITTING MACHINE FOR QUILTS AND THE LIKE

David Barth, New York, N. Y.

Application October 23, 1948, Serial No. 56,148

3 Claims. (Cl. 164—65)

This invention relates to new and useful improvements in trimming machines, and, more particularly, the aim is to provide a novel and valuable machine adapted to be power driven to advance a quilted sheet past the fields of operation of a pair of edge-trimming cutters adapted also to be power driven, and all in such manner that the quilted sheet, despite its unusually difficult to handle nature, may be properly passed through the machine and in a way to cause parallel lines of travel to be maintained for its opposite side edges, where indiscriminately varying masses of the contained cotton batting or the like project, for expeditious and perfect trimming off of these more or less spongy projections.

A feature of the invention is a special means for holding the quilted sheet, during its advance toward the cutters, properly smoothly spread.

Another feature of the invention is the ready adjustability of the cutters to vary the spacing of their fields of operation, to adapt the machine for trimming a quilted sheet of any width within the designed capacity of the machine.

A further feature of the invention is a guiding means auxiliary to said holding and spreading means for assisting to control the position of the quilted sheet during its immediate adjacency to the cutters to insure that the lines of trim be exactly as predetermined relative to the width of the sheet.

Still another feature of the invention is an arrangement whereby each cutter is driven by its own electric motor, and with such cutters and motors carried by a single swingably mounted support, whereby on swinging said support upwardly the cutters and their motors may be cleared away from the normal fields of operations of the cutters, thereby in turn to facilitate inspection and adjustment of the parts of the cutter and motor assemblies, and particularly to facilitate proper placement of the forward end of the quilted sheet relative to the above-mentioned holding and spreading means, to the field of operation of the cutters, and to the power driven advancing means.

Various other features of the invention will be pointed out or become apparent hereinafter.

For further comprehension of the invention, and of the objects and advantages thereof, reference will be had to the following description and accompanying drawings, and to the appended claims in which the various novel features of the invention are more particularly set forth.

In the acompanying drawings forming a material part of this disclosure:

Fig. 3 is a perspective view of the rear of the machine, with the latter partially broken away at its bottom.

Figure 1:
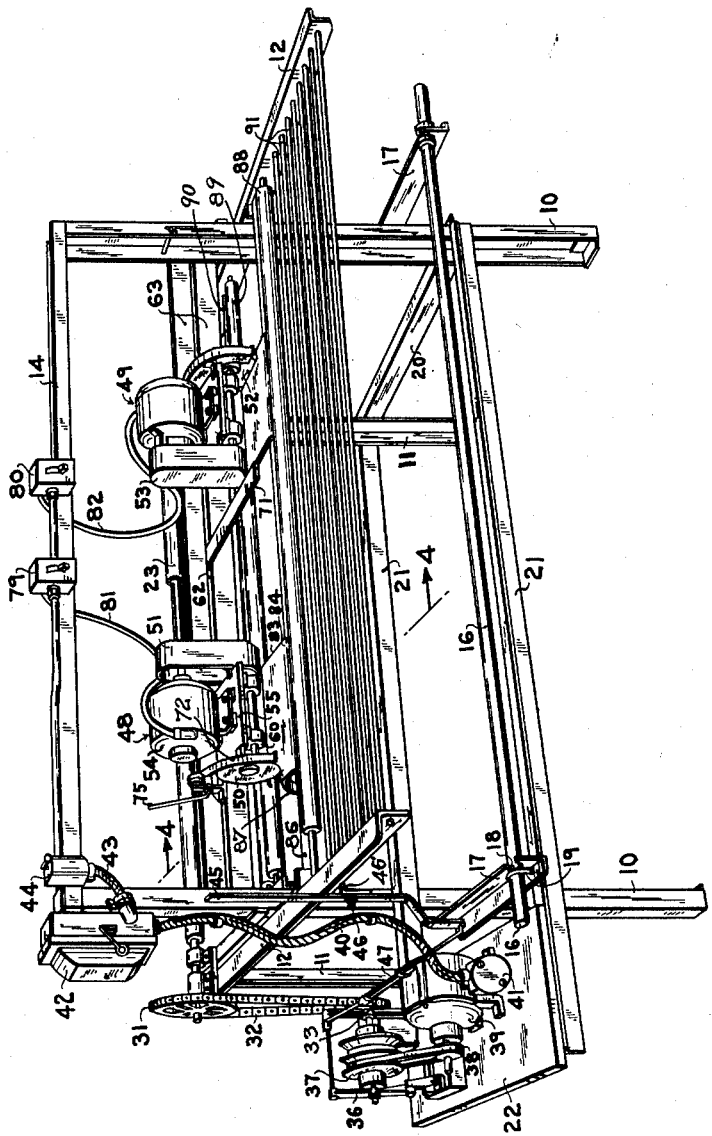
Fig. 1 is a frontal perspective view of a now favored embodiment of the new machine.

Referring to the drawings more in detail, and first especially to Figs. 1-4, the machine is illustrated as having a framework comprising variously suitably interconnected elongate members, some of channel iron type and others of angle iron type; thereby to provide a pair of like front legs 10, a pair of like rear legs 11, a pair of like horizontally extended side bars 12 each joining the top of a rear leg 11 and one of the front legs 10 at a point intermediate the height of the latter. Said side bars 12 forwardly project beyond the front legs 10; and said front legs at their tops are joined by a top bar 14, thereby providing an upper structure 15 which is of inverted U-shape.

For mounting a front feed-off roller 16, rigidly forwardly extended from the front legs 10, at a suitable level below the side bars 12, are a pair of like horizontal bars 17. The bars 17 are of angle iron type, with one of the flanges of each vertically upstanding. Said flanges have cut-outs therein for journalling the roller 16 at spaced points therealong adjacent to cross-pins 18 sent through said roller. During feed-off of a quilted sheet preliminarily wrapped around the roller 16, said roller is held against lift out of its journalling supports by U-straps 19 suitably secured to the horizontal flanges of the bars 17. The cross-pins 18 are arranged to be readily removably carried by the roller 16; and following temporary removal of said pins, said roller may be endwisely slid for partial or complete detachment.

With the legs 10 and 11 at each side of the machine connected by two like tie bars 20, the two legs of each pair of legs 10 and 11 are connected by a like tie bar 21. These last-named bars are extended beyond the legs 10 and 11 at the left in Fig. 1; and secured to such extensions is a platform 22.

A take-up roller means is provided at the rear of the machine, this comprising a take-up roller 23 having at one end a hinge connection 24 with a short shaft 25 journalled in a pair of bearing blocks 26 secured, respectively, at the rear end and on the top of one of the side bars 12, and at the rear and on the top of an adjoining bar-like support 27 suitably secured in place. The opposite end of the roller 23 is journalled in a split bearing block on the other side bar 12, said block having a removable cap member 28 normally held in position by a screw 29, such screw being turnable to allow removal of said cap member for temporarily freeing the adjacent end of the roller 23. This roller 23 has a longitudinally extending cut-away portion 30.

During operation of the machine, said roller 23 is rotated in take-up direction by a power drive transmission including a sprocket 31 fixed on the shaft 25, and a chain 32 engaging said sprocket and a sprocket 33 fixed on the power take-off shaft 34 of a familiar type of reduction-gear device in a casing 35 fixed on the platform 22; said device having a rocker arm 36 which when thrown to one position permits a power drive to be imparted to the shaft 34 and which in another position cuts off such power drive. Power input to said device is by way of a pulley 37, driven by a belt 38 from an electric motor 39, also secured to said platform, and energizable by way of wires in a conduit 40 leading from a junction box 41 on the platform to a junction box 42 mounted at the top of the machine near the adjacent end of the top bar 14. Suitable wiring is extended, as through a conduit 43, between the box 42 and a switch in a switch box 44 for manually opening and closing the motor circuit.

Following closing of the said switch, the take-up roller 23 may be started and stopped as desired, by rocking of the arm 36; such starting effected by pulling forward the upper handle portion of a lever 45 pivotally mounted at 46 on a hanger 46' fixed to and depending from the adjacent side bar 12, and such stopping being effected by moving the lever back to the position shown in the drawings. An operative connection between said lever and the rocker arm 36 is provided which includes a length-adjustable link 47.

The two cutter assemblies are, respectively, and each as a whole, marked 48 and 49. They are exactly alike, except that, now referring to Fig. 1, whereas the circular knife 50 and the belt-housing guard 51 are respectively at the left and at the right of the assembly 48, the circular knife 52 and the belt-housing guard 53 are respectively at the right and at the left of the assembly 49.

It will suffice, therefore, to describe in detail merely the assembly 48. As shown best in Fig. 4, when taken in connection with Figs. 1 and 3, said assembly comprises an electric motor 54 secured to the top of a plate 55 and having fixed on its shaft a pulley 56 connected by a belt 57 to a pulley 58 fixed on a shaft 59 journalled in a pair of bearing blocks 60 secured to and dependent from the plate 55. The guard 51 is suitably detachably connected to said plate.

The rear end portion of said plate 55, just in advance of which rear end portion is a transversely arranged bottom stop rib 61, extends through a comparatively wide slot 62 running along almost the entirety of the length of a rocker bar 63 of T-shaped cross-section. The major part of the width of said slot extends horizontally through the T-staff portion of said rocker bar. To the rear end of the plate 55 a slide piece 64 is suitably movably attached, as at 65 (Fig. 3), and there are fixedly rearwardly projected from the rear of said plate the shanks of a pair of bolts 66, each equipped in back of the slide piece 64 with a wing nut 67.

Thus, by loosening these wing nuts, and the corresponding wing nuts of the other cutter assembly 49, either or both such assemblies may be variously adjusted along the length of the slot 62 to locate the knives 50 and 52 exactly as desired in agreement with the desired trimmed width of a quilted sheet to be trimmed.

The rocker bar 63 is swingably mounted at opposite ends by like structures including pivot pins aligned horizontally and parallel with the front of the machine. Each of these structures, as shown in the case of the one seen in Fig. 4 and at the left in Fig. 3, comprises an L-bracket 68 secured as indicated to an end of the rocker bar, a plate 69 suitably secured to the outer side of the central web of the adjacent channel leg 19 and rearwardly projected alongside the projected limb of the bracket 68; these portions of said plate and bracket being matchingly apertured for the mounting of one of said pivot pins, the latter marked 70.

Figure 5:
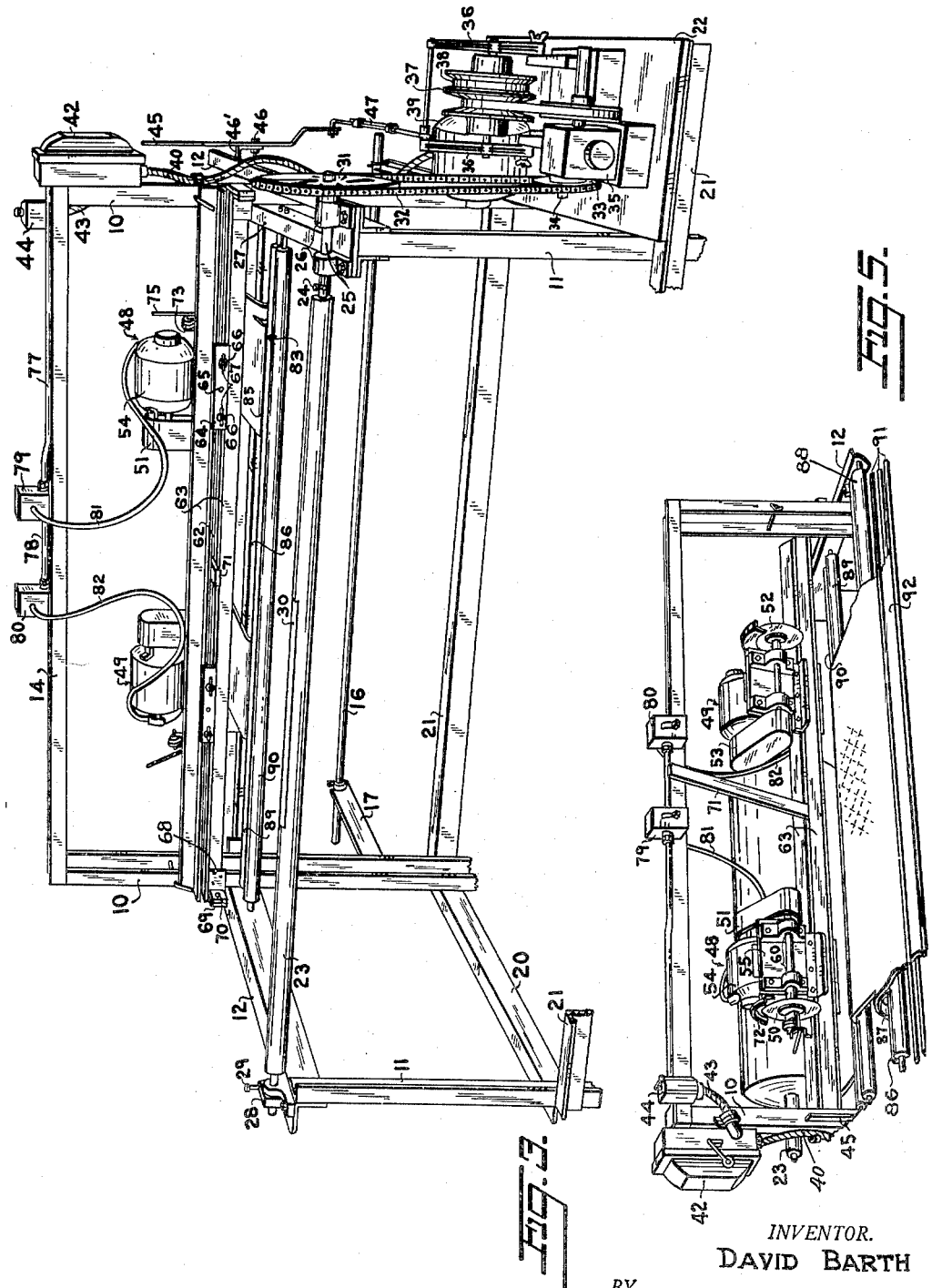
Fig. 5 is a view similar to a portion of Fig. 1, but with the cutter assemblies swung upward to clear them away from their normal locations whereat the cutters are in working positions relative to the quilted sheet; this view omitting various parts of the machine, but showing a quilted sheet as though in course of being adjusted for advancement toward the cutters.
Figure 6:
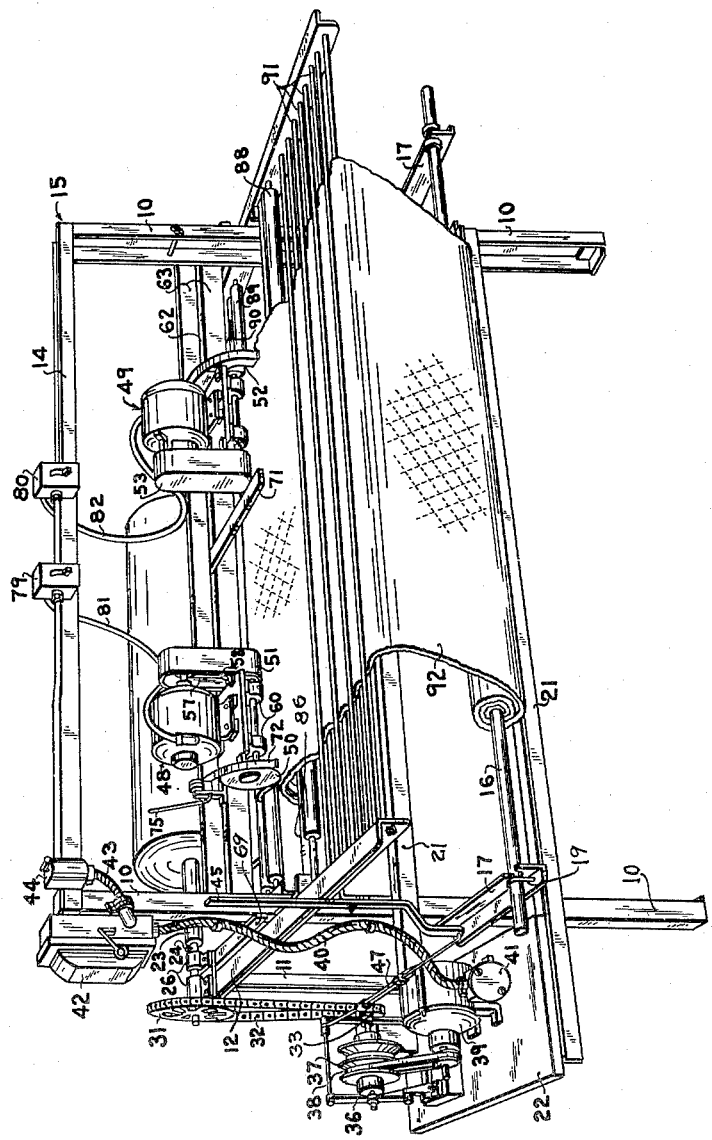
Fig. 6 is a view like Fig. 1, showing the quilted sheet being advanced through the machine and being trimmed at its opposite side edges.

For rocking the bar 63, to lift the two cutter assemblies 48 and 49 as shown in Fig. 6, a forwardly projecting handle 71 is at its rear end suitably affixed to said bar, as in the slot 62 at a central point along its length. With the parts as in Fig. 5, the weight distribution in the said assemblies is such that the latter tend to remain raised; and when the handle 71 is lowered, the weight of the cutter assemblies 48 and 49 is moved to the other side of the pivot pins 70 to maintain the cutter assemblies in the operative lowered positions shown in Figs. 1, 2 and 3.

Further to continue the detailed description of the cutter assembly 48, the knife 50 is provided with a guard 72 at its upper end suitably connected to a mount 73 pivotally attached as at 74 to the rocker bar 63 at a point above the plate 55. Said mount has a handle 75, whereby said guard may when desired be cleared away from the knife; a spring 76 being provided for normally holding the guard over the knife.

For independently starting and stopping the two motors of the cutter assemblies 48 and 49, suitable wiring is extended, as within the conduits marked 77 and 78 in Fig. 3, to two switch boxes 79 and 80 on the top bar 14; the wiring for the motor of the assembly 48 including a flexible cable 81 from the switch box 79, and the wiring for the motor of the assembly 49 including a flexible cable 82 from the switch box 80.

Figures 2, 4:
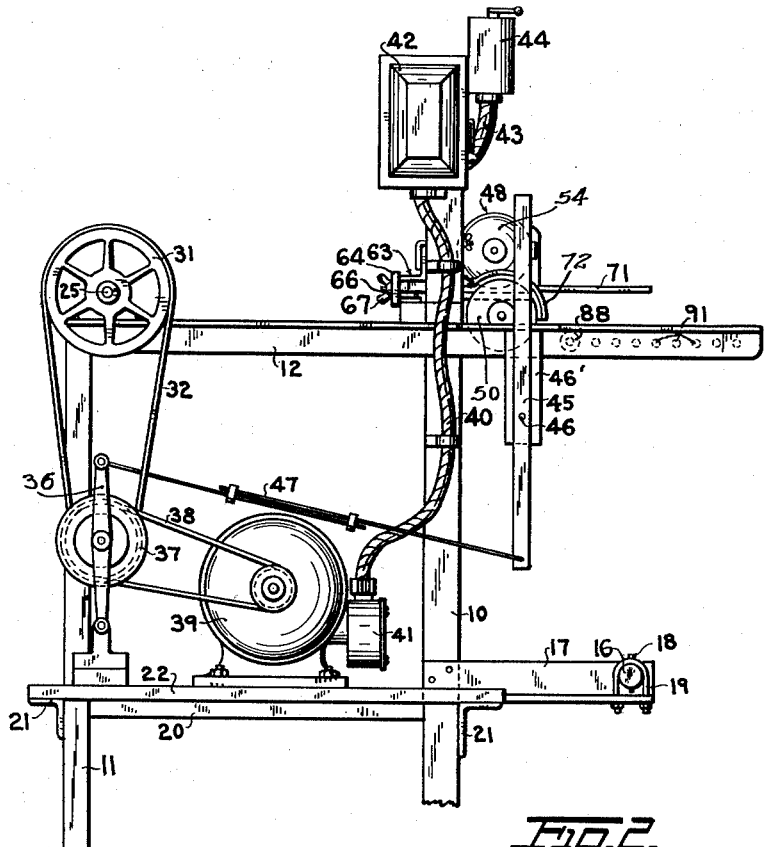
Fig. 2 is an end elevation thereof, looking toward the right in Fig. 1.
Fig. 4 is an enlarged detail view, this being a section taken substantially on the line 4—4 of Fig. 1.

Referring now again particularly to the cutter assembly 48, and in this connection again to Figs. 1, 3 and 4, a bed or platform support for the quilted sheet at the portion thereof over an area centered laterally of the machine about the field of operation of the knife 50 is present in the form of a plate 83. This plate has a downwardly dipped front end portion 84 and a downwardly dipped rear end portion 85. Said plate, suitably restrainingly slidingly supported on a channel cross member 86 extended between and secured to the side bars 12, is slotted, to allow entry of the cutting edge of the knife 50, as best shown in Fig. 4, and at such slot the portion of the plate 83 between said knife and the adjacent side of the machine is downwardly inclined as at 87, there providing a spillway for the surplus material trimmed off at that side of the quilted sheet.

With the two cutter assemblies arranged as in all the views except Fig. 5, the adjustment of either of such assembly along the slot 62 of the rocker bar 63 results in an accompanying proper adjustment of the plate 83 or of the corresponding plate of the assembly 49, due to the entry of the knife 50 or 52 into the aforesaid slot of the plate.

The mechanism for guiding the quilted sheet exactly as desired toward the cutting knives, and at the same time for holding the difficult to handle sheet properly spread and yet without permanently compacting or deforming the contained cotton batting or like material, comprises, in addition to a roller 88 just ahead of the plate 83 and the corresponding plate of the cutter assembly 49, and a pair of rollers 89 and 90 just beyond said plates, a series of preferably smaller rollers 91; all these rollers being parallel and journalled for free rotation at their opposite ends in the side bars 12. Preferably, also, the rollers 88, 89 and 90 have their axes so arranged that the tops of said rollers are somewhat above the top level of the main portions of said plates.

In operation, and now referring particularly to Figs. 5 and 6, and with the cutter assemblies 48 and 49 raised as in Fig. 5, a quilted sheet 92 is fully wrapped around the feed-off roller 16 except for a lead off length of said sheet, which length is extended upward to the series of rollers 91 and threaded serpentine fashion relative thereto, first over one roller and then under the next roller, and then passed over the rollers 88, 89 and 90, after which the sheet at its forward end is attached to the take-up roller 23, as by suitably securing said end in the recess 30 of said roller 23. Of course, the cutter assemblies 48 and 49 were previously adjusted laterally of the machine as already explained, in agreement with the desired lines of trim along the opposite sides of the sheet 92.

If it be desired that during one travel of the entirety of the quilted sheet through the machine said sheet shall be trimmed all along its opposite sides, the cutter assemblies 48 and 49 may be lowered and their motors energized just before advancing the forward end of the sheet through the fields of operation of the knives 50 and 52; and such advance may be effected in any suitable way, as by suitably connecting points along said forward sheet end and the take-up roller 23.

However the forward end of the sheet 92 may be attached to said roller, the power used for rotation of the roller must be considerable, in part because of the described engagement of the sheet with the series of rollers 91, and for reasons connected with the characteristic nature of quilted material the said roller 23 should not be rotated at too high a speed. Hence the provision of the reduction-gear means 35 and the described connections between the same and the hand lever 45.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a trimming machine having rollers for guiding a strip of material from a feed-off roller across cutting plates and onto a driven take-up roller, means for trimming the side edges of the strip of material as it passes over the top of the cutting plates, comprising an inverted U-shaped frame extended above the cutting plates and slightly to one side thereof on the side adjacent the take-up roller, a bar extended across said frame slightly above the cutting plates and formed with a horizontal elongated slot, a cutter assembly for each of the cutting plates for trimming the side edges of the strip of material, each of said cutter assemblies comprising a mounting plate having one edge portion extended into the slot of said bar, a disc cutter rotatively mounted on the bottom face of said mounting plate to cooperate with the respective cutting plate in trimming the respective side edge of the strip of material when said disc cutter is rotated, means on said mounting plate for rotating said disc cutter, and means for retaining said cutter assemblies in desired spaced positions along the length of said slot in said bar for varying the width of the trimmed portion of said strip of material, said bar having its ends pivotally attached to said U-shaped frame at the sides thereof so that said cutter assemblies can be raised to inoperative positions in which their disc cutters will be raised above the cutting plates.

2. In a trimming machine having rollers for guiding a strip of material from a feed-off roller across cutting plates and onto a driven take-up roller, means for trimming the side edges of the strip of material as it passes over the top of the cutting plates, comprising an inverted U-shaped frame extended above the cutting plates and slightly to one side thereof on the side adjacent the take-up roller, a bar extended across said frame slightly above the cutting plates and formed with a horizontal elongated slot, a cutter assembly for each of the cutting plates for trimming the side edges of the strip of material, each of said cutter assemblies comprising a mounting plate having one edge portion extended into the slot of said bar, a disc cutter rotatively mounted on the bottom face of said mounting plate to cooperate with the respective cutting plate in trimming the respective side edge of the strip of material when said disc cutter is rotated, means on said mounting plate for rotating said disc cutter, means for retaining said cutter assemblies in desired spaced positions along the length of said slot in said bar for varying the width of the trimmed portion of said strip of material, plates secured to said frame and having portions extended rearward therefrom along the ends of said slotted bar, L-shaped brackets secured by one of their legs to the rear face of said slotted bar at the ends thereof, said brackets having the other of their legs extended along the inner faces of said rearwardly extended portions of said plates, said rearwardly extended portions of said plates and the said other legs of said brackets being formed with aligned apertures, and pins engaged through said aligned apertures pivotally supporting said slotted bar, so constructed and arranged that said bar can be pivoted to raise said cutter assemblies to inoperative positions in which their cutter discs will be raised above the cutting plates.

3. In a trimming machine having rollers for guiding a strip of material from a feed-off roller across cutting plates and onto a driven take-up roller, means for trimming the side edges of the strip of material as it passes over the top of the cutting plates, comprising an inverted U-shaped frame extended above the cutting plates and slightly to one side thereof on the side adjacent the take-up roller, a bar extended across said frame slightly above the cutting plates and formed with a horizontal elongated slot, a cutter assembly for each of the cutting plates for trimming the side edges of the strip of material, each of said cutter assemblies comprising a mounting plate having one edge portion extended into the slot of said bar, a disc cutter rotatively mounted on the bottom face of said mounting plate to cooperate with the respective cutting plate in trimming the respective side edge of the strip of material when said disc cutter is rotated, means on said mounting plate for rotating said disc cutter, means for retaining said cutter assemblies in desired spaced positions along the length of said slot in said bar for varying the width of the trimmed portion of said strip of material, plates secured to said frame and having portions extended rearward therefrom along the ends of said slotted bar, L-shaped brackets secured by one of their legs to the rear face of said slotted bar at the ends thereof, said brackets having the other of their legs extended along the inner faces of said rearwardly extended portions of said plates, said rearwardly extended portions of said plates and the said other legs of said brackets being formed with aligned apertures, pins engaged through said aligned apertures pivotally supporting said slotted bar, so constructed and arranged that said bar can be pivoted to raise said cutter assemblies to inoperative positions in which their cutter discs will be raised above the cutting plates, and an upwardly inclined handle secured to said slotted bar intermediate of its ends to be manually lowered to pivot said slotted bar about said pins and lower said cutter assemblies to operative positions.

DAVID BARTH.

REFERENCES CITED

The following references are of record in the file of this patent:

UNITED STATES PATENTS

| Number | Name | Date |
|---|---|---|
| 610,526 | Feister | Sept. 13, 1898 |
| 1,306,642 | Stevens | June 10, 1919 |
| 2,003,404 | Valentine | June 4, 1935 |
| 2,132,713 | Winkler | Oct. 11, 1938 |
| 2,321,299 | Johnson | June 8, 1943 |

FOREIGN PATENTS

| Number | Country | Date |
|---|---|---|
| 397,715 | France | Mar. 5, 1909 |
| 404,582 | France | Dec. 6, 1909 |
| 679,828 | Germany | Aug. 14, 1939 |